July 25, 1939. J. H. L. DE BATS ET AL 2,167,544
METHOD OF MAKING HARD METAL ARTICLES
Filed Sept. 9, 1937 5 Sheets-Sheet 1

INVENTORS
Jean Hubert Louis De Bats
John Ritz
BY
Emery, Varney, Whittemore + Dix
ATTORNEYS

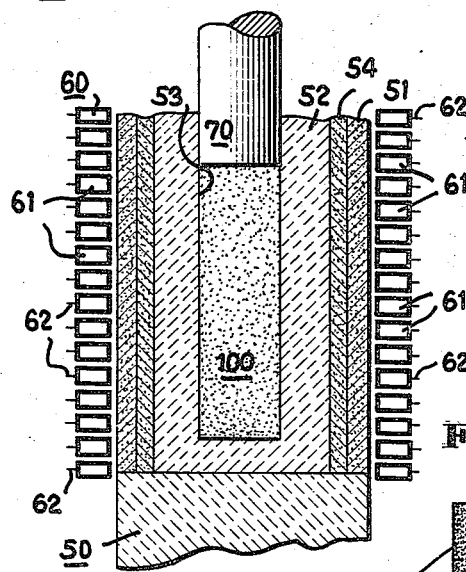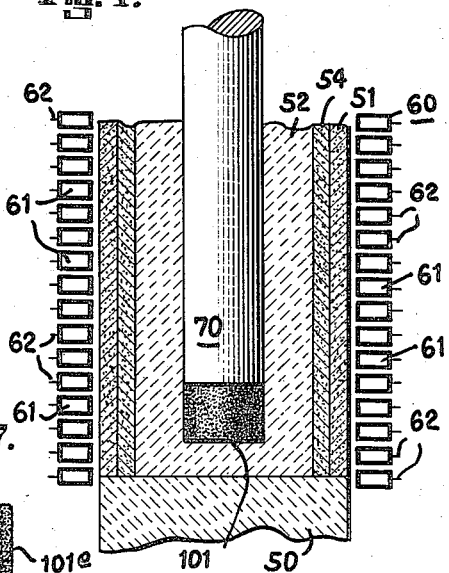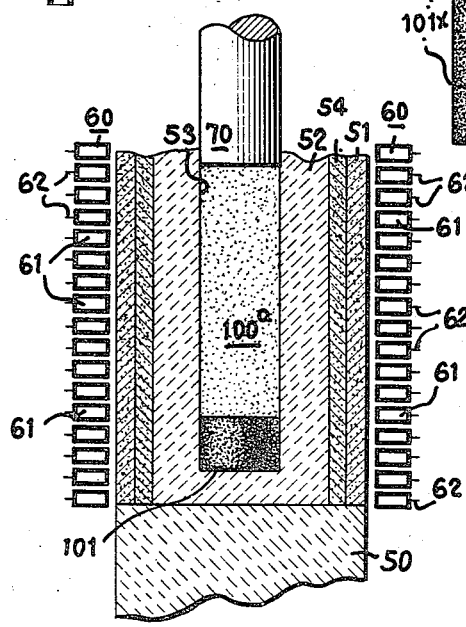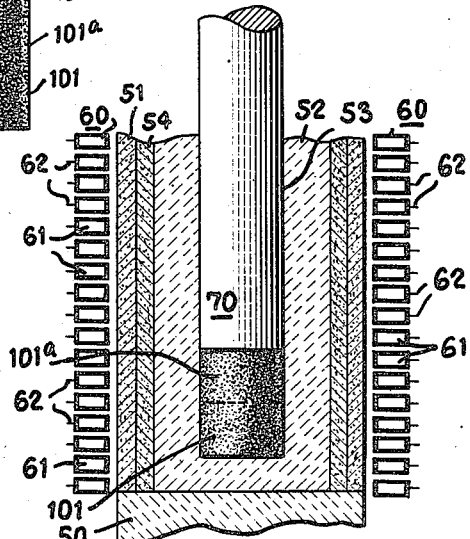

July 25, 1939. J. H. L. DE BATS ET AL 2,167,544
METHOD OF MAKING HARD METAL ARTICLES
Filed Sept. 9, 1937 5 Sheets-Sheet 3
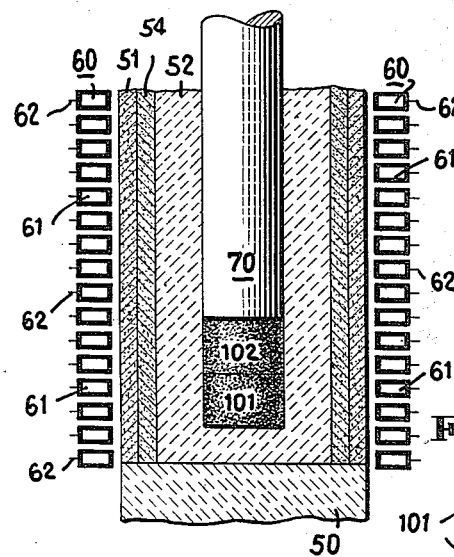
Fig. 8.
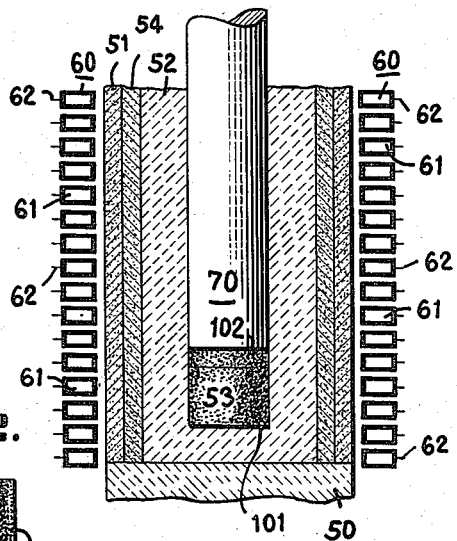
Fig. 9.
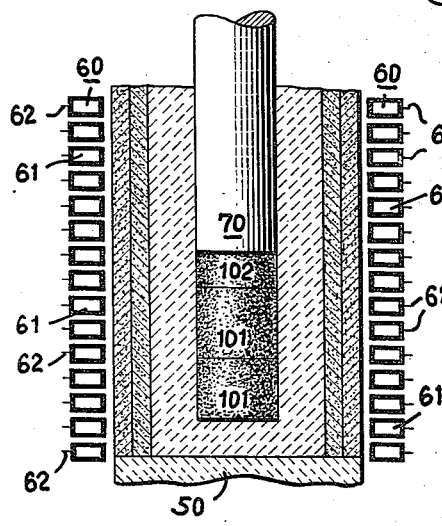
Fig. 10.
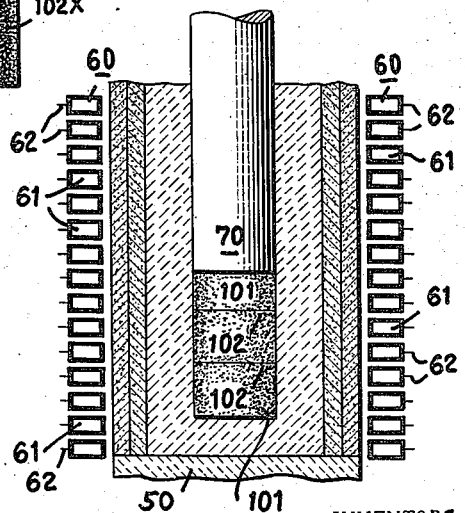
Fig. 11.
Fig. 12.
INVENTORS
Jean Hubert Louis De Bats
John Ritz
BY
Emery, Varney, Whittemore + Dix
ATTORNEYS.

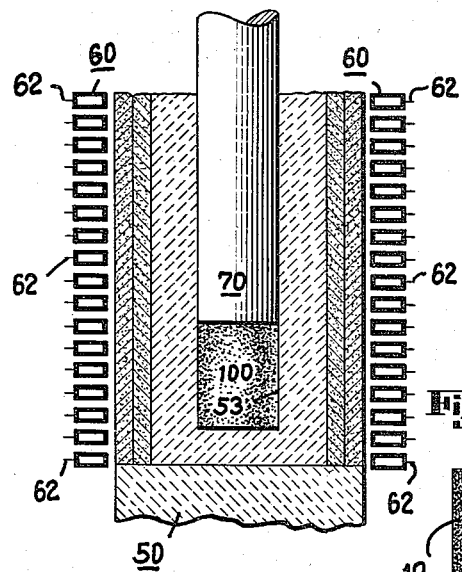
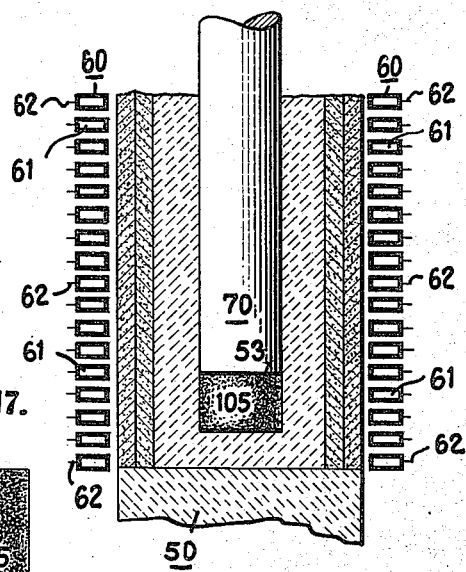
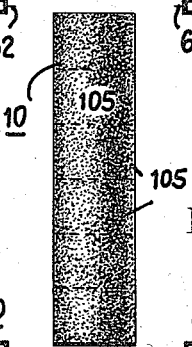
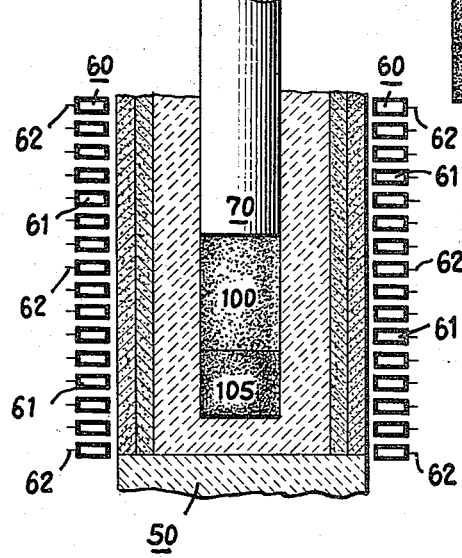
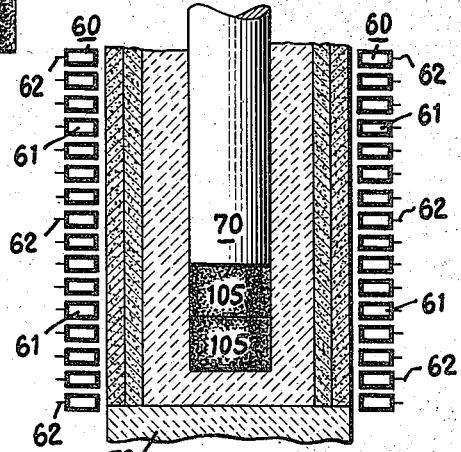

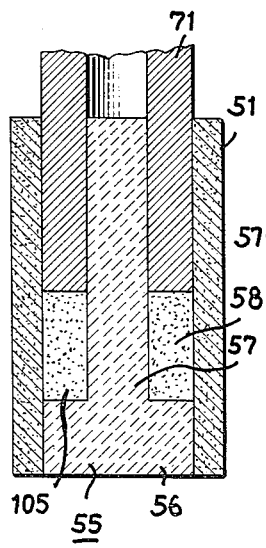
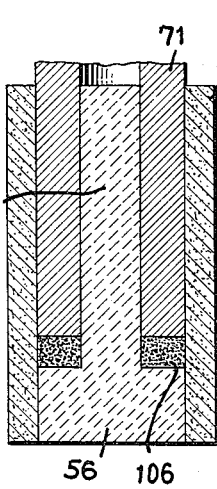
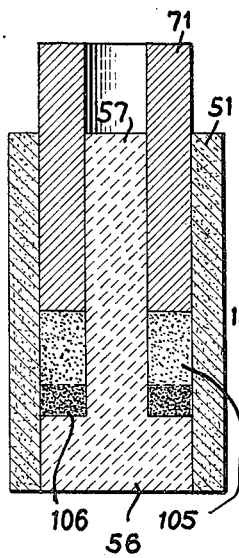
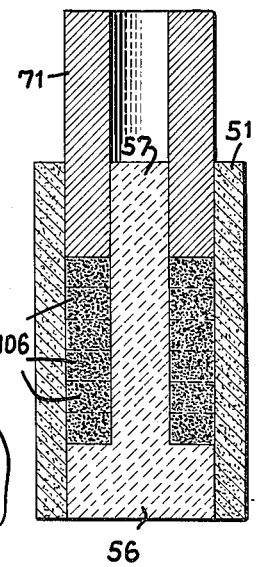
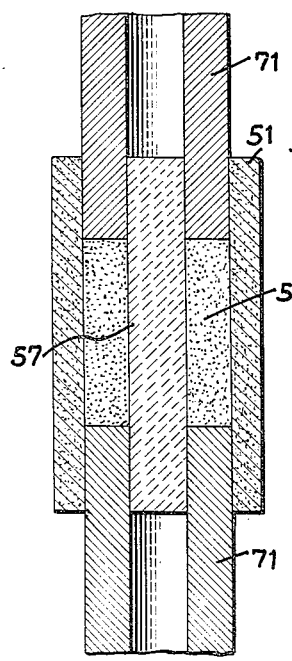
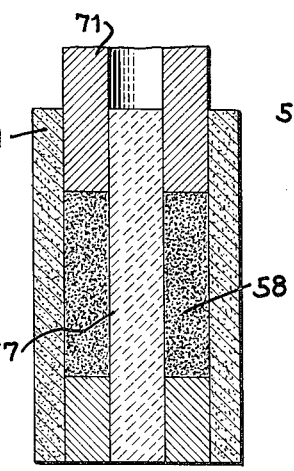
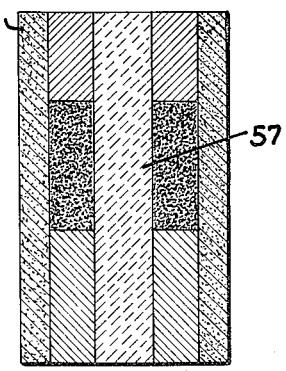

Patented July 25, 1939

2,167,544

UNITED STATES PATENT OFFICE 2,167,544

METHOD OF MAKING HARD METAL ARTICLES

Jean Hubert Louis De Bats, East Orange, N. J., and John A. Ritz, Youngstown, Ohio, assignors to Metal Carbides Corporation, Youngstown, Ohio, a corporation of New Jersey Application September 9, 1937, Serial No. 162,966

7 Claims. (Cl. 75—137)

This invention relates to improvements in rolls for rolling and shaping metals in rolling mills and for other types of machines, and the invention also pertains to rolling mills as well as to the novel processes for making the rolls.

More particularly, the present invention is concerned with the manufacture of improved rolls and of bulky machine members and of apparatus parts which are fabricated from tungsten carbide and its alloys, as well as from other hard carbides and compounds having high hardness, and which are susceptible of manipulation and formation according to the novel processes set forth and defined hereinafter, and also to the machines and apparatus in which such rolls and other parts are embodied.

The enormous stresses, operating pressures, heat-engendered deformations, and abrasion, to which the rolls of rolling mills are normally subjected, are well known. The rotation of rolls, while under any pressure, sets up torsional and tensional stresses in the rolls, which stresses are of great magnitude. The metal being rolled or worked cuts and mars the surface of the rolls, which cut and marred roll surfaces, in turn, cut and mar the surface of the metal being rolled. Heats encountered in operation are unevenly distributed in the rolls, so that extreme distortion of the roll body is the result. To meet these conditions, steels, alloyed steels, cast iron and alloyed cast irons have been used. Such rolls, while possessing desirable toughness, have not been characterized by such degree of hardness or crushing strength as would render them suitable for continued use. With toughness, hardness, and controlled heat-engendered deformation thus holding the center of the stage as the prime characteristics desired for rolls, and with tungsten carbide and its alloys, and other like hard materials being so hard and lacking in toughness as to require the addition of ductile binding metals, in discrete form, to secure even small fabricated or formed shapes and various small articles of any sort, it will be appreciated that the utility and possibility of the use of powdered hard carbides to form tough, hard-surfaced, working rolls for rolling mills, is distinctly contra-indicated.

In the prior application of one of the inventors herein, J. H. L. De Bats, Ser. No. 751,768, filed November 6, 1934, there is disclosed and claimed the making of rolls from tungsten carbide and its alloys, as well as from other hard materials. In addition, the aforesaid application discloses the fabrication of rolls in suitable electric furnaces, and usually in a single forming operation.

It has now been found that the desirable advantages of preparing and using rolls and other bulky articles and parts of tungsten carbide and its alloys, as well as of other like hard materials, may be more advantageously accomplished by preparing the rolls or other bulky objects and members, seriatim, that is, in step-wise processes and treatments. To this end, for example, a charge of tungsten carbide, or of a tungsten carbide alloy, or of any desired alloy, is charged into a suitable furnace, preferably an electric furnace, and desirably of the induction type, containing a mold of graphite or carbon and having the general shape of the finished article. The hard carbide material in the mold is then subjected to pressure, and, while compressed, is heated, locally and focally to effect consolidation and densification of the mass into a solid, homogeneous body. The focal or local heating is preferably carried out from one or both ends or from the central portion of the mass or body of material, progressively towards both ends. By this treatment or procedure, the compressed, high-melting powder, is progressively or serially consolidated into a solid, continuous mass of uniform density from one end of the member to the other end thereof, so that a truly homogeneous structure is obtained throughout. On cooling, the so-formed member may be removed from the furnace, and finished, as by diamond grinding, polishing and lapping, to give a continuous exterior surface of a roll or of any other bulky article, machine part or device, which surface is incapable, apparently, of being marked or scored by the metal being worked, and, consequently, cannot mark or score strip metal, plates, rods, wire, or other metal forms contacted therewith and worked thereby. In addition, due to the durability of the extraordinarily smooth and polished surface of roll members, even with extended use, there is effected a smoother finish of the rolled or otherwise treated products. Due to the extraordinary thermal reactions of tungsten carbide and its alloys, and particularly to the enormous amount of heat engendered in the rolling of metals, there is exhibited a resultant uniform swelling of the roll, or other members, and a corresponding lack of distortion of surfaces, which distortion is so characteristic of other rolls now available for use.

Rolling mills incorporating rolls and other massive or bulky parts made according to the present invention are characterized by smoother performance in operation, than are mills using ordinary cast steel or cast iron alloy rolls. In addition, the throughput of our new mills is measurably superior to that of the best alloy roll-equipped mills. Heretofore, in such conventional mills, for example, in reversing cold rolling mills doing finish work, a throughput of ten (10) coils of strip metal, before regrinding is needed, is considered extraordinary performance. In the use of rolls made in accordance with the teachings herein, throughputs of almost five-hundred (500) coils of the same strip metal have been made without any regrinding, and with wear of the surfaces of the rolls, when measured with micrometer calipers, of only 0.0003". Here also, it is to be noted, and most unusually, that the wear was even, and was not confined to the portions of the roll surfaces in contact with the edges of the strip being rolled.

Other methods of adapting the principles of the present invention to the working of hard carbides include the preparation of relatively thin discs or members, and the consolidation of the same with other like members, either directly, or with the interposition of powdered materials of the same composition, and the compression and heating of the assembly locally and progressively, to cause the entire body to form an integral, homogeneous mass.

A third method of operation includes the preparation of a compressed charge, followed by its heating and consolidation into a disc or member, and the sequential addition of further amounts of powdered material of the same composition on top thereof, such additions being followed, in each instance, by the compression and heating steps, to form integrally consolidated, large bodies comprising successive increments of homogeneous structure and composition.

A fourth method of operation includes the preparation of a number of individual, compressed and consolidated, heated, sintered, or fused or semi-fused discs or members, in a suitable furnace, followed by the necessary heating and compression steps, to consolidate the entire mass into a unitary member.

A fifth method includes the steps of preliminarily compressing the powdered starting materials into coherent masses, which are thereby rendered susceptible of handling, and thereafter furnacing a number of such members together with interposed material, or even directly.

The articles formed according to the novel processes outlined above are characterized by a truly homogeneous physical and chemical structure. This is of paramount importance, as due to the operative procedures followed, it is possible to secure articles, such as rolls for rolling mills, with a uniform structure and surface and in which the joints of the original discs or members do not show, and, therefore, do not cause points or lines of weakness in the surface of the rolls or other members.

The articles or members formed, may be solid or cored, or tubular, and, again, they may be provided with supporting inserts. Owing to the substantially microscopic operative control of the materials and of the forming of the sections, including the compression and heating steps, the forming and control apparatus may be appreciably reduced in size, yet the bulk of the articles produced will not interpose any serious operative limitations.

The question of bulk of finished articles, when dealing with high melting compounds of the type comprehended within the purview and scope of the present invention, and including the group comprised of the carbides of tungsten, molybdenum, vanadium, tantalum, titanium, chromium or alloys thereof, as well as with materials of equivalent hardness and high melting characteristics, with or without binder metals, has always been dependent upon the type and size of apparatus available. This is evidenced by the fact that the present, most widely publicized, developments of tungsten carbide-binder metal articles, wearing parts, and devices generally, are restricted in size to small things such as tips for measuring instruments, small discs, small tool nibs, and other articles of like size. In fact, the general trend in this field has been and is away from large bulky articles, and toward small, replaceable parts for machines and tools.

By way of general recapitulation, then, it is to be noted that the improvements of the present invention provide novel and efficient methods for fabricating bulky articles and members for machines from hard carbides of the group comprising the carbides of tungsten, molybdenum, vanadium, tantalum, titanium, chromium, as well as alloys thereof or compositions including binder metals. More particularly, the disclosures of the present invention are directed to the fabrication of rolls for rolling mills, as well as to cylindrical roller bearings and other bulky articles and machine parts.

The factual elaboration of the hard carbides and alloys described herein, into massive, homogeneous members and articles, such as rolls and bearings for heavy-duty use in rolling mills, will be best understood by reference to the accompanying drawings, forming a part hereof, in which certain procedural steps and products are illustrated by way of example only, for, since the underlying principles may be embodied in other specific processes, it is not intended to be limited to the ones here exemplified, except as such limitations are clearly imposed by the appended claims.

In the drawings, like numerals refer to similar parts throughout the several views, of which—

Fig. 3 is a vertical section, partly in elevation, of a combination press and furnace with a mold therein and filled with a powdered charge;

Fig. 4 is a view similar to Fig. 3, showing the compacted and consolidated roll disc;

Fig. 5 is a view similar to Figs. 3 and 4, showing the introduction of a second powder charge on the first disc or roll element;

Fig. 6 is a view similar to Fig. 4, showing a pair of powder charges consolidated into a unitary roll section;

Fig. 7 is an elevation of a finished roll barrel, the separate, original, charges being indicated by dotted lines;

Figs. 8 to 11, inclusive, are views similar to Figs. 3 to 6, inclusive, and showing the use of preformed discs or elements with interposed material compressed and consolidated in place;

Fig. 12 is a view similar to Fig. 7, showing a finished roll, the roll segments and originally interposed cementing additions being indicated in phantom view;

Fig. 13 is a view similar to Fig. 3, showing the formation of a compressed roll segment or disc;

Fig. 14 is a view similar to Fig. 13, showing the segment compressed;

Fig. 15 is a view similar to Fig. 14, showing the addition of powdered material for the formation of a second additional roll segment;

Fig. 16 is a view similar to Fig. 15, showing the second addition compressed on the first roll segment;

Fig. 17 is a view similar to Figs. 7 and 12, showing a finished roll, the original segments being indicated in phantom view;

Figs. 18 to 21, inclusive, are views similar to Figs. 3 to 6, showing the method of forming tubular or hollow rolls and roll sheaths, by preparing and consolidating collars, rings or segments of annular shape about a core member, and Figs. 22 to 24, inclusive, are vertical sections of apparatus for forming roll sheaths or surfaces from a single or plural charge or charges by compression, accompanied by focal and progressive heating of the charge.

Figure 2:
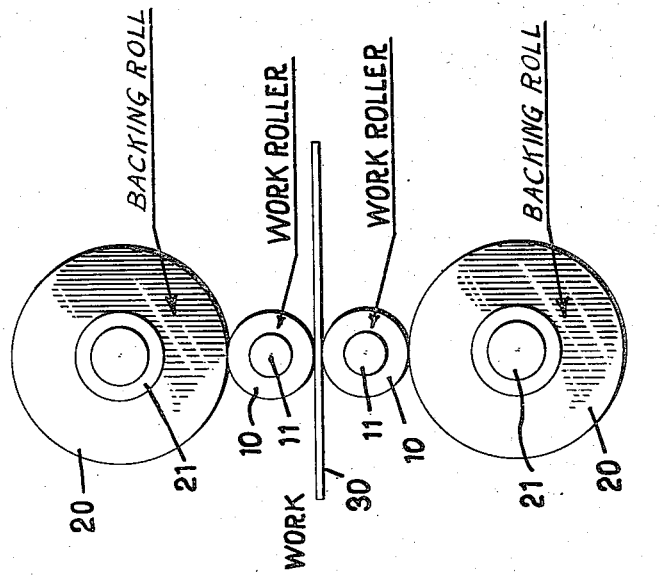
Fig. 2 is a side elevation of the rolling mill structure shown in Fig. 1.
Figure 1:
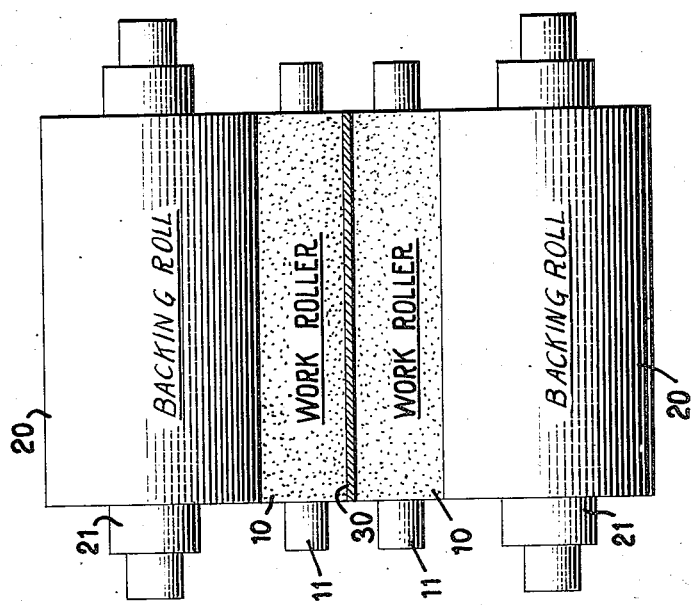
Fig. 1 is a front elevation of the rolls of a 4-high rolling mill, showing the rolls of the present invention in use as work rolls.

In the description of the methods of formation of rolls for rolling mills, and with special reference to work rolls for the 4-high type of rolling mills, the structures shown in Figs. 1 and 2 will be considered first, in order to consider the factors involved in rolling mill design and operation, and the manner in which the teachings of the present invention serve to simplify and improve rolling mill procedure generally. As the present invention is concerned primarily with the rolls in rolling mills rather than with assembly and erection details and apparatus parts, the particular description will be directed to the rolls, it being understood that the showings of Figs. 1 and 2 are intended to cover the necessary stands and driving apparatus, which, being of conventional construction, and not involving invention, per se, are not here shown.

Considering the mill structure of Figs. 1 and 2, a pair of work rolls 10 are provided with necks 11, which are adapted to be rotatably supported in spring bushings, not shown. Mounted in the same roll stand, to form a four-high mill, are a pair of backing or pressure rolls 20 having necks 21. These rolls are also mounted in spring bushings, not shown. A strip of sheet metal 30 is shown between the work rolls 10. The several sets of rolls may be operated separately or together, or they may be free-moving, and caused to rotate by the pulling of the work strip 30 therethrough. The work rolls can be of various diameters, 2 to 6 inches, up to 20 inches or more, while the backing or pressure rolls 20 are of appreciably greater diameter, and, preferably, two or more times the diameter of the individual work rolls. The rolls are normally designed to take up expansion due to heating in service. With the present type of work rolls, the heat distribution is so uniform, and the resultant expansion is so slight, that extraordinary precautions do not have to be taken in their use. Likewise, because of this uniform and relatively small expansion, and, because of the further fact of the enormous wear resistance of the hard work rolls, as at present advised, substantially very little account of regrinding, either of the surfaces of the work rolls or the pressure rolls, has to be observed. These characteristics of the rolls of the present invention permit distinct simplification in the maintenance of both types of rolls, and cut down or eliminate a large portion of the redressing of the rolls, which is a constant procedure in the use of alloy rolls. The surface shape of the rolls can now be designed so as to more closely approximate a true, flat rolling of the strip and positive working of the metal at the edge of the strip, without any danger of the marking up of the surfaces of the working rolls. With all these improvements, it is now possible to use hard carbide metals for the working rolls, with remarkable improvements in the quality, finish, and throughput of the metal being rolled. Suitable pressure devices will be used on the stands to impose the desired pressures on the pressure rolls, and, through them, to the work rolls. In operation, the usual precautions will be taken to keep the strip free from scale, as the ultra hard surfaces of the present work rolls tend to press such particles of scale and dirt back into the surface of the strip being rolled. Suitable lubrication may be used to facilitate the reduction of the metal through the rolls. Not only do the rolls of the present invention give better operative results with lubrication, but it has been found that the strip metal can be rolled dry during sustained periods of rolling operation, and with normal reductions, without introducing any difficulties into the rolling operation, which feature, has not been possible with other rolls, hitherto available.

Peculiarly efficient results are obtained in the rolling of stainless steel strip, due to the extraordinarily smooth finish of the new hard carbide work rolls, and the usual buffing and finishing operations which are now required, even with the best alloy rolls available, can be appreciably reduced. Not only does strip rolling with the new hard carbide rolls cut down the finishing costs, even for materials which are required to have a highly finished surface, but the operative control of the process is rendered simpler, and the throughput is increased so greatly that the production costs for all kinds of rolling are reduced to a hitherto unattainable minimum.

The work rolls 10 may be produced simply and efficiently in what may be called a series process, wherein the discrete, hard carbide material is compressed and consolidated into homogeneous, massive articles, in a series of steps, which will now be described.

The rolls and other massive articles made according to the teachings of the present invention, may be fabricated in a combination electric furnace and press installation of the type shown generally in Figs. 3 to 6, 8 to 11, and 13 to 16, inclusive. The apparatus includes a base support 50 of any suitable material, and desirably of insulating composition. Mounted on the support 50 may be an insulating sheath or shield 51 forming a furnace chamber. Inside this chamber is introduced a crucible or mold 52 having a central chamber or mold conformed to the surface of the finished articles. Where rolls or other articles of large diameter are to be made, a graphite or other core or cores may be incorporated in the mold assembly, to aid in the uniform heating of the metallic mass throughout its body and to obtain a greater density in the finished article. Between the sheath 51 and the mold 52 may be interposed a packing of carbon or of insulating material. The mold 52, and cores, may be made of carbon or graphite. In some cases, the mold may be made of magnesia or other heat-resistant refractory material. In such cases, the use of a heat conductor or sleeve will be desirable. The activating coil or coils of the furnace, are designated generally by the numeral 60. These coils may be fixed or movable, and may comprise a number of coils, as shown, or may comprise only a few turns, particularly in the case where movable coils are used. To permit close control of the heating, the separate turns 61 of the coils 60, may each be provided with individual current leads 62, which can be connected to a suitable control panel, not shown. By this arrangement, the coils can be energized throughout, or one or more turns at a time, or any group of turns may be separately controlled and energized. In this way, the furnace and contained mold and material may be heated as a unit, or progressively from the center towards one or both ends. Where a movable coil of relatively few turns is used, the progressive heating may be accomplished by appropriate shifting movement of the energized coil. Appropriate movement of the mold within the coil may be resorted to where the size of the articles, or other circumstances permit or dictate.

The furnace assembly described immediately above, is desirably incorporated in a press or forge, so as to permit the compression of any material in the mold chamber. Such apparatus is well known in the art and may be a power-driven installation or a hydraulic press. The particular press structure forms no specific part of the present invention, and all suitable presses or forges may be represented generally and schematically by the hammer or piston head 70 which is shown conformed to and adapted for sliding fit in the mold chamber or space 53.

In the fabrication of rolls and other articles according to the present invention, one very successful method is illustrated in Figs. 3 to 7, inclusive. A charge 100 of particulate or powdered hard carbide of the group comprising any of the compounds listed herein, or their alloys, is introduced into the mold chamber 53 in the mold 52. The plunger of press or forge member 70 is then forced down or impacted onto the discrete mass to densify the same. While held in this compressed condition, the mass is heated by the coil 60 to the point of semi-fusion, so as to permit the consolidation of the mass under pressure. Only a sufficient number of turns 61 of coil 60 will be used as is necessary to heat the mass 100 to the desired temperature. The temperature required will vary for each hard carbide and alloy or mixture thereof, which temperatures will be determined by test, so that the control apparatus may be properly calibrated in terms of working temperatures. The compressed and consolidated mass now forms a homogeneous slug or disc 101 as shown in Fig. 4. The discs or roll elements 101 are desirably of slight thickness, of a maximum of 2 inches, although thicker elements may be made. After the first element 101 is made, the compression member 70 is withdrawn from the mold chamber, and a second charge 100a is introduced into the mold on top of the now formed disc or element 101 as indicated in Fig. 5. The compression member 70 is again introduced into the mold chamber and compresses and densifies the second charge down to the desired thickness, and upon preform 101. At this point, the necessary heating, required for the consolidation of the second charge 100a and its welding with preform 101 to form a homogeneous mass, is obtained by energizing the turns 61 of coil 60 which are in juxtaposition to the area to be heated. Owing to the individual turn control, the necessary heat can be applied at any spot or area desired, and a true spot or focal heating is obtained. To indicate the sequential formation of the rolls or other articles, dotted lines 101x are used, as in Fig. 7. A roll or barrel 10 as shown in Fig. 7, may be made up of the requisite number of sections, discs, or elements 101 prepared according to the teachings above, and such completed article will be found to be homogeneous in physical and chemical structure throughout its entire mass. On removing the roll 10 from the mold, it may be cleaned and finished to any desired surface finish, depending upon the work it is to do. Necks 11 may be formed separately on the ends of the barrel or roll in the usual manner, and of hard carbides, and at the time of making the roll, or they may be added later.

The method illustrated in Figs. 8 to 12, inclusive, includes the preparation of preforms 101, of suitable shape and thickness, and their introduction into molds 51. In this case, a layer of powdered material of the same composition as the preforms is placed between them, after which the usual compression and heating treatments are given to insure the formation of a homogeneous roll or other member 10b. The intermediate charge or welding layer is designated by the number 102. Here again, the applied heat is so controlled as to cause the necessary consolidation of the layers 102 and their welding with the juxtaposed preforms 101. In the finished roll shown in Fig. 12, the original presence of these intermediate layers is indicated in phantom view by the numeral 102x. As described above, the preforms 101 may also be directly welded together without the use of intermediate charges or welding layers.

Another method of forming rolls and other members by increments, or with preforms, is illustrated in Figs. 13 to 17, inclusive. In this particular method, the charges 100 are compressed to coherent masses 105 which masses are later consolidated by heating under pressure. A plurality of such masses are formed, and introduced into a furnace, or are formed directly in a furnace. At this point, the pressure is applied concomitantly with the application of the heat. Here, again, it is to be noted, the heat is applied serially from one end of the mold to the other, or from the center towards both ends. With a constant, predetermined pressure applied, the several preforms will be individually heated and consolidated and will be welded onto the abutting segments or roll elements, with the result that a truly and completely homogeneous, finshed roll or other product will be secured. This method has the advantage of simplicity, one feature of which is the use of a coil of few turns which may be moved longitudinally of the mold, as well as the use of a large coil with the separate turns under individual control. In this case also, the finished product may have necks formed directly, or welded on after the roll body is finished. The usual finishing and surfacing operations can be carried out on the finished rolls or other members after they have been formed and taken out of the mold.

The fabrication of solid members, as set forth in detail hereinabove, is but one aspect of the present invention. Hollow, or cored members, either rolls, sheaths, or bearing members, rings, and other apparatus parts, may also be made, and in any desired size and shape.

In the illustrations comprising Figs. 18 to 21, inclusive, there is shown a method of forming hollow members, such as rings, and of consolidating a number of such rings into a large sized cylinder or sheath. The principles of operation are the same as for the solid members. The usual furnace member or sheath 51 may be provided with a mandrel 55 having a bottom, disk portion 56 and a central spindle 57. The central spindle 57 forms a chamber 58 with the sheath 51. The chamber 58, as shown, is of annular cross-section, the specific configuration depending upon the shape of the furnace lining or sheath and of the spindle or mandrel. A piston head or plunger 71 is conformed to the chamber 58 formed in the furnace. The pressure member 71 is part of a forge or power press, either mechanical or hydraulic. The usual electrical coils and control apparatus will be associated with the furnace section 51 as described in detail hereinabove. The furnace and mold members 51 and 55 may be made of graphite, or carbon, if the material under treatment is diamagnetic. If, however, the material is paramagnetic, such as iron, nickel, cobalt, steel, and alloys or aggregates containing the same, the members 51 and 55 may be made of insulating refractory or heat-resistant materials such as magnesia, zirconia, chromite, and the like. A charge 105 of the hard carbide materials hereinabove described, is introduced into the mold chamber 58, around and about the spindle or mandrel 57, and the compression member 71 is actuated and brought down on the charge to compress it to a desired degree and density. When this condition has been attained the current is applied to the coils 60 to effect the necessary heating and consolidation of the mass, as indicated at 106, in Fig. 19. Following this, as shown in Fig. 20, a second charge 105 is placed upon the annular disc or ring 106, and is compressed and consolidated in the same manner, being also welded into a homogeneous unit with the first disc or ring. This process is repeated, as indicated in Fig. 21, until a hollow cylinder or sheath of the desired length is fabricated. The usual cleaning and polishing operations may then be carried out. Where the finished hollow cylinders are to be used as the working faces or surfaces of rolls for rolling mills, they may be provided with central shafts of steel or other suitable metals or alloys, which may be cast in place, or preformed and secured in any suitable manner.

In the modification shown in Figs. 22 to 24, inclusive, opposed pistons or compression members 71 are used, and the charge 105 compressed from both ends. Here, also, the heating of the compressed mass may be effected from one or both ends or from the center of the mass towards both ends. These operations, it will be noted, are entirely feasible, due to the control afforded by individual control of the separate turns of the exciting coils of the furnaces.

It will now be appreciated that there has been provided novel methods for preparing massive articles of tungsten carbide and its alloys, and other like mineralogically hard materials, and desirably in the shape of solid and hollow rolls or sheathings and surfacings for rolls, as well as smaller articles intended to work under heavy operating loads, and which are required to have nondeformable surfaces together with a minimum of differential expansion in the parts. It will also be appreciated that there has also been provided novel methods for preparing such members in solid form directly from particulate material and by local, progressive heating, and suitable pressure, as well as by the manufacture of preforms and the assembly of such preforms into complete and unitary bodies having uniform, homogeneous metallic structure throughout, and uniform hardness characteristics over the entire working surface.

What is claimed is:

1. The method of making a hard metal article from powdered material, which comprises compressing the material in a mold by exerting pressure lengthwise of the mold, and while compressing it applying heat to it locally and progressively lengthwise of the mold to consolidate the entire mass of material.

2. The method of making from powdered material a hard metal article having its length at least several times its diameter and homogeneous in composition throughout, which comprises compressing the material in a mold by exerting pressure lengthwise of the mold, and while compressing it supplying heat from a source located externally of the mass of material to heat the compressed mass locally and propressively lengthwise of the mold to consolidate the entire mass of material.

3. In the method of making a hard metal carbide article by the simultaneous application of heat and pressure to a charge, the step consisting in applying the heat locally only at any one time but progressively lengthwise of the charge while pressing the charge in the direction of its length.

4. The method of making a rolling mill roll having a length at least several times its diameter, which comprises introducing a charge containing a hard metal carbide into a mold, and while compressing the charge in a lengthwise direction heating it locally and progressively in a lengthwise direction.

5. The method of making a hard metal article from powdered material, which comprises preforming the powdered material into compressed elements, placing th preformed elements in a mold in superposed relation, and while compressing the elements subjecting them to local progressive heating lengthwise of the mold to consolidate them.

6. The method of making from powdered material a massive hard metal article having a length at least several times its diameter, which comprises introducing a powdered charge into a mold, simultaneously heating and pressing the charge, adding more powdered material to the compressed charge, simultaneously heating and pressing the added charge, and repeating the process until a structure of desired size is obtained, the heat being applied locally and progressively to the added portions of the charge, so that the zone of heat application moves lengthwise of the charge as the article is being built up.

7. The method of making a hard metal article from powdered material of the class described, which comprises compressing the material in a mold, and while compressing it applying heat to it locally and progressively to consolidate the material, the zone of heat application moving in the same direction as that in which the compression is exerted.

JEAN HUBERT LOUIS DE BATS.
JOHN A. RITZ.